UNITED STATES PATENT OFFICE 2,087,132

QUATERNARY AMMONIUM COMPOUNDS

Ludwig Taub and Friedrich Leuchs, Wuppertal-Elberfeld, Germany, assignors, by mesne assignments, to Alba Pharmaceutical Company, Inc., New York, N. Y., a corporation of New York No Drawing. Application April 7, 1934, Serial No. 719,601. In Germany April 13, 1933

8 Claims. (Cl. 260—127)

This invention relates to quaternary ammonium compounds which display bactericidal and fungicidal properties.

In accordance with the present invention quaternary ammonium compounds displaying bactericidal and fungicidal properties are obtainable by the manufacture of such quaternary ammonium compounds which contain attached to the nitrogen beside saturated organic radicals at least one higher molecular aliphatic ether radical, the ether-like bound oxygen atom of which is separated from the quaternary nitrogen atom by at least 2 carbon atoms. Such higher aliphatic ether radicals are, for instance, octyloxyethyl, dodecyloxyethyl, octyloxypropyl, octadecyloxyethyl radicals and the like. Advantageously the higher molecular aliphatic ether radical contains from 8 to 20 carbon atoms. The said aliphatic ether radicals may also contain substituents, for instance, hydroxyl, alkoxy and amino groups, as for instance in the decyloxy-hydroxypropyl radical. It may be mentioned that when using the term "higher molecular aliphatic ether radical" in the specification and in the appended claims it is intended to include also the said substitution products of such higher molecular aliphatic radicals. The other saturated organic radicals are preferably saturated lower alkyl groups but also higher saturated alkyl groups containing 8 to 18 carbon atoms or cycloaliphatic groups, for instance, the cyclopentyl or cyclohexyl group may be present as saturated substituents in the new quaternary ammonium compounds.

The new quaternary ammonium compounds specified may be prepared according to the methods known per se, for instance, by reacting upon a saturated primary, secondary or tertiary amine with an ester of a higher molecular aliphatic alcohol containing an ether-like bound oxygen atom which is separated from the esterified hydroxyl group by at least 2 carbon atoms. In case by such reaction secondary or tertiary amines are obtained they are transformed into quaternary compounds by the action of reactive esters of saturated alcohols. Esters particularly suitable for the said purpose are the hydrohalic and benzene sulfonic acid esters of the alcohols. The reaction is normally performed with heating, if desired or required with the addition of a solvent or diluent.

Alternatively one may start with such amines which contain a higher molecular ether radical as above specified and transform these amines into the corresponding quaternary ammonium compounds by the action of reactive esters of saturated alcohols, The amino compounds thus obtainable are in part crystalline, in part thickly liquid substances which in general readily dissolve in water.

The invention is further illustrated by the following examples without being restricted thereto:—

*Example 1.*—278 parts by weight of $\gamma$-dodecyloxy-$\beta$-hydroxy-$\alpha$-chloropropane boiling at 168° C. under 1 mm. pressure are treated with 60 parts by weight of trimethylamine which has been dissolved in the 5-fold quantity of benzene. After several days standing in a closed vessel the ($\gamma$-dodecyloxy-$\beta$-hydroxypropyl) - trimethyl-ammoniumchloride formed is filtered with suction and liberated from oily impurities by washing with benzene. The salt is obtained as crumbly-crystalline mass with no distinct melting point. It is readily soluble in water.

The corresponding bromide is obtained, for instance, by reacting with methylbromide upon ($\gamma$-dodecyloxy-$\beta$-hydroxypropyl) - dimethylamine which is obtained by treating $\gamma$-dodecyloxy-$\beta$-hydroxy-$\alpha$-chloropropane with dimethylamine as a colorless base which can be distilled in vacuo without decomposition.

When starting with tributylamine and $\gamma$-dodecyloxy-$\beta$-hydroxy-$\alpha$-chloropropane, ($\gamma$-dodecyloxy-$\beta$-hydroxy-propyl)-tributylammoniumchloride is obtained as a water-soluble crystalline product.

*Example 2.*—128 parts by weight of cyclohexylethylamine are heated in a closed vessel together with 278 parts by weight of $\gamma$-dodecyloxy-$\beta$-hydroxy-$\alpha$-chloropropane for 6 hours to 140° C. After cooling the viscous mass is dissolved in water. The cyclohexyl-ethyl-($\gamma$-dodecyl-$\beta$-hydroxypropyl)-amine is separated as a yellowish oil by means of excess caustic soda. The oil is treated without purification with the calculated quantity of methyliodide. Thus the methyl-cyclohexyl-ethyl-($\gamma$-dodecyloxy-$\beta$-hydroxypropyl)-ammoniumiodide is obtained as a yellowish white crumbly mass which is clearly soluble in water.

*Example 3.*—59 parts by weight of trimethylamine are heated with 237 parts by weight of n-octyloxyethylbromide in a closed vessel for 4 hours to 100–120° C. After cooling the trimethyl-n-octyloxyethylammoniumbromide is obtained as a viscous sirup crystallizing after prolonged standing and being clearly soluble in water.

When using instead of trimethylamine the corresponding quantity of tri-hydroxyethyl-amine, the tri-hydroxyethyl-n-octyloxyethyl-ammoniumbromide is obtained in the form of a water-soluble product.

The n-octyloxyethylbromide boiling at 158–160° C. under 2 mm. pressure which is necessary for performing the above processes is obtained by reacting with hydrogen bromide upon n-octyl-mono-glycolether which is obtained from n-octyl-alcohol and ethylene oxide.

*Example 4.*—To a solution of 233 parts by weight of diethyl-decyloxyethylamine in 1000 parts by weight of dry benzene 142 parts by weight of methyliodide are added. The mixture is heated in a closed vessel for several hours to 60–80° C. After cooling the benzene is evaporated in vacuo. The remaining methyl-diethyl-decyloxyethyl-ammoniumiodide forms a yellowish-brown viscous mass which is soluble in water.

The diethyl-decyloxyethylamine required for performing the reaction is obtained by treatment of sodium decylate with diethylaminoethylchloride.

For certain purposes it is advisable to use the quaternary ammonium compounds described above in the form of salts with acids other than the hydrohalic acids. In such cases the hydrohalic acid salts can be transformed in the manner known per se into salts with other mineral or organic acids, for instance, into salts of nitric, sulfuric, alkyl- and phenyl-sulfonic, phosphoric, formic, acetic, lactic, citric, tartaric, benzoic, salicylic acid and the like. If the free quaternary ammonium bases are to be used they may be liberated from their salts by the addition of strong alkali, such as potassium or sodium hydroxide in the usual manner. The free ammonium bases are in part crystalline, in part thickly liquid hygroscopic substances which dissolve in organic solvents, such as alcohols, acetic ester and in water with strong alkaline reaction.

We claim:—

1. Quaternary ammonium compounds containing attached to the nitrogen beside three saturated aliphatic radicals only one higher molecular aliphatic ether radical of 8 to 20 carbon atoms, containing one ether-like bound oxygen atom which is separated from the quaternary nitrogen atom by at least two carbon atoms, and an anion selected from the group consisting of the hydroxyl group and the anions of mineral and organic acids.

2. Quaternary ammonium compounds containing attached to the nitrogen three saturated aliphatic radicals selected from the group consisting of lower alkyl and lower hydroxyalkyl groups, only one higher molecular aliphatic ether radical of 8 to 20 carbon atoms containing one ether-like bound oxygen atom which is separated from the quaternary nitrogen atom by at least two carbon atoms, and an anion selected from the group consisting of the hydroxyl group and the anions of mineral and organic acids.

3. Quaternary ammonium compounds containing attached to the nitrogen three saturated aliphatic radicals selected from the group consisting of lower alkyl and lower hydroxyalkyl groups, only one higher molecular aliphatic ether radical of 8 to 20 carbon atoms containing one ether-like bound oxygen atom which is separated from the quaternary nitrogen atom by at least two carbon atoms, and the anion of a hydrohalic acid.

4. Quaternary ammonium halides containing attached to the nitrogen three saturated aliphatic radicals selected from the group consisting of lower alkyl and lower hydroxyalkyl groups, only one higher molecular aliphatic ether radical of 8 to 20 carbon atoms containing one ether-like bound oxygen atom which is separated from the quaternary nitrogen atom by at least two carbon atoms, and the anion of a hydrohalic acid.

5. Trimethyl-($\gamma$-dodecyloxy-$\beta$-hydroxy-propyl)-ammoniumchloride which is a crystalline water-soluble product.

6. Quaternary ammonium halides containing attached to the nitrogen three saturated aliphatic radicals selected from the group consisting of lower alkyl and lower hydroxyalkyl groups, one gamma-dodecyloxy-$\beta$-hydroxypropyl radical, and the anion of a hydrohalic acid.

7. Trialkyl-(gamma-dodecyloxy-$\beta$-hydroxypropyl)-ammonium halides, in which the alkyl groups are lower alkyl groups.

8. Trimethyl-(gamma-dodecyloxy-$\beta$-hydroxypropyl)-ammonium halides.

LUDWIG TAUB.
FRIEDRICH LEUCHS.